(12) United States Patent  
Majumdar

(10) Patent No.: US 8,387,672 B2
(45) Date of Patent: Mar. 5, 2013

(54) PNEUMATIC TIRE WITH BUILT-IN SEALANT LAYER COMPOSITE

(75) Inventor: Ramendra Nath Majumdar, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 467 days.

(21) Appl. No.: 12/726,362

(22) Filed: Mar. 18, 2010

(65) Prior Publication Data

US 2011/0226399 A1    Sep. 22, 2011

(51) Int. Cl.
*B60C 19/12* (2006.01)
(52) U.S. Cl. ......................... 152/503; 152/505
(58) Field of Classification Search .............. 152/502, 152/503, 505, 507; *B60C 19/12*
See application file for complete search history.

(56) References Cited

U.S. PATENT DOCUMENTS

| | | | | |
|---|---|---|---|---|
| 3,523,472 | A * | 8/1970 | Marzocchi et al. | 152/527 |
| 4,539,344 | A * | 9/1985 | Van Ornum et al. | 523/166 |
| 4,919,183 | A * | 4/1990 | Dobson | 152/502 |
| 4,957,573 | A * | 9/1990 | Gomberg | 156/115 |
| 6,598,634 | B1 * | 7/2003 | Koch et al. | 152/197 |
| 2004/0089388 | A1 * | 5/2004 | Fujino et al. | 152/510 |
| 2004/0149366 | A1 * | 8/2004 | Makino et al. | 152/505 |
| 2005/0113502 | A1 | 5/2005 | Wall et al. | 524/425 |
| 2009/0078352 | A1 | 3/2009 | Majumdar et al. | 152/504 |
| 2009/0191402 | A1 | 7/2009 | Beiermann et al. | 428/323 |

FOREIGN PATENT DOCUMENTS

| | | |
|---|---|---|
| DE | 102007031274 | 1/2009 |
| DE | 102008003554 | 7/2009 |
| EP | 949090 | 10/1999 |
| EP | 2045103 | 4/2009 |
| GB | 1056601 | 1/1967 |
| GB | 2176157 | 12/1986 |

OTHER PUBLICATIONS

European Search Report completed May 31, 2011.

* cited by examiner

*Primary Examiner* — Justin Fischer
*Assistant Examiner* — Philip N Schwartz
(74) *Attorney, Agent, or Firm* — Henry C. Young, Jr.

(57) ABSTRACT

The present invention is directed to a pneumatic tire with a built-in sealant layer composite where the composite is composed of polyurethane with a thin layer of at least one of particulate filler, short fibers and non-woven microfiber. In one embodiment, said polyurethane sealant composite is comprised of a plurality of circumferentially extending layers comprised of a first polyurethane sealant layer, a second polyurethane sealant layer and a thin layer of polyurethane sealant-containing non-woven microfiber positioned between said first and second polyurethane layers. In another embodiment, said polyurethane sealant is a composite comprised of a polyurethane sealant layer containing a thin layer of at least one of particulate filler and short fibers.

3 Claims, 4 Drawing Sheets

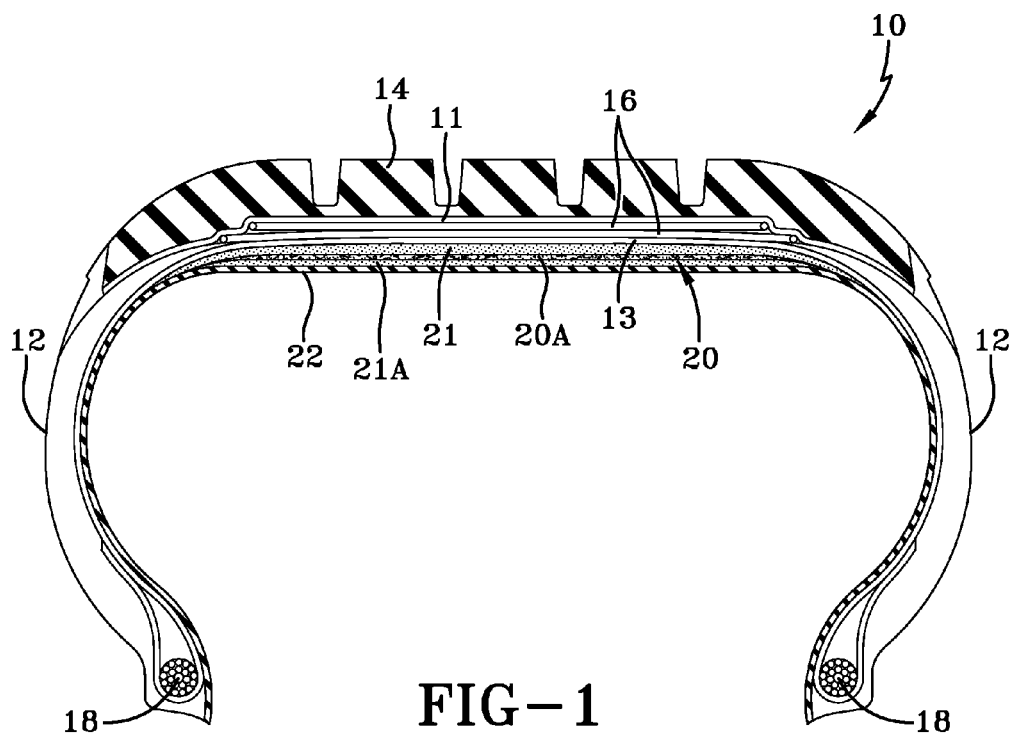
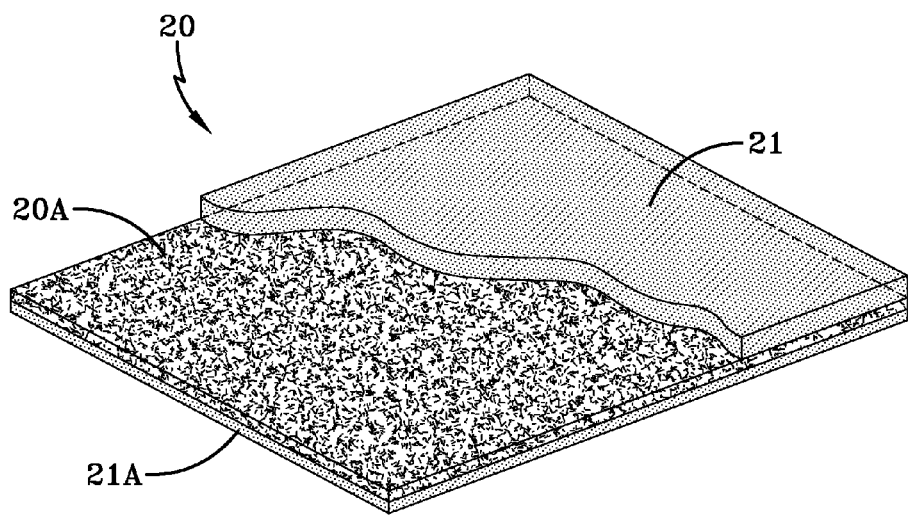

PNEUMATIC TIRE WITH BUILT-IN SEALANT LAYER COMPOSITE

FIELD OF THE INVENTION

The present invention is directed to a pneumatic tire with a built-in sealant layer composite where the composite is composed of polyurethane with a thin layer of at least one of particulate filler, short fibers and non-woven microfiber. In one embodiment, said polyurethane sealant composite is comprised of a plurality of circumferentially extending layers comprised of a first polyurethane sealant layer, a second polyurethane sealant layer and a thin layer of polyurethane sealant-containing non-woven microfiber positioned between said first and second polyurethane layers. In another embodiment, said polyurethane sealant is a composite comprised of a polyurethane sealant layer containing a thin layer of at least one of particulate filler and short fibers.

BACKGROUND OF THE INVENTION

Pneumatic tires have been suggested which contain built in polyurethane based sealant layers which can flow into a tire puncture hole for a purpose of resisting flow of tire inflation air through the tire puncture and to thereby promote a resistance of the pneumatic tire going flat by loss of tire inflation air. For example, see U.S. Patent Publication No. 2009/0078352.

SUMMARY OF THE INVENTION

In accordance with this invention, a pneumatic tire is provided which is comprised of an outer circumferential rubber tread, a supporting carcass containing an innermost carcass barrier rubber layer, and a rubber innerliner disposed inwardly from said supporting carcass and thereby inwardly from said carcass barrier rubber layer;

wherein said tire has a built-in composite of polyurethane based sealant layer positioned between and adjacent to said carcass barrier rubber layer of said supporting carcass and said rubber innerliner;

wherein said composite of polyurethane based sealant layer is a multilayered composite extending in a circumferential direction comprised of a thick polyurethane layer and a thin polyurethane layer with a thin intermediate layer positioned between said thick and thin polyurethane layers comprised of at least one of:

(A) non-woven microfiber layer containing said polyurethane,
(B) particulate pigment,
(C) discrete short fibers, and
(D) cured rubber particles.

In one embodiment of the invention, said thin polyurethane layer of said multilayered sealant composite is positioned adjacent to said innerliner rubber layer.

In one embodiment, the pneumatic tire with built-in sealant layer composite, before cure, includes an unvulcanized pneumatic tire assembly, which includes an outer circumferential rubber tread and a supporting carcass containing said innermost carcass barrier rubber layer. A precursor polyurethane based sealant layer composite is situated (positioned) between, and adjacent to, said carcass barrier rubber layer of said supporting carcass and an innermost rubber innerliner layer. The precursor polyurethane sealant layer is self-supporting. The precursor polyurethane based sealant layer provides self-sealing properties to a pneumatic tire after vulcanization of the unvulcanized pneumatic tire assembly. Specifically, the polyurethane based precursor sealant layer, during curing, thermally degrades so as to provide a tacky, self-healing polyurethane composition which defines the built-in sealant layer.

In one embodiment, the polyurethane based sealant precursor composite is a multilayered composite (extending in a circumferential direction) comprised of a relatively thick layer of said polyurethane sealant precursor, a thin layer of said polyurethane sealant precursor and a thin layer of non-woven microfiber containing said polyurethane based sealant precursor positioned therebetween.

In practice, said thin polyurethane based precursor layer of said multilayered polyurethane sealant composite is positioned between, and adjacent to (next to and in contact with) said carcass barrier rubber layer of said supporting carcass and an innermost rubber innerliner layer. Thus the non-woven microfiber layer contained in said sealant layer composite is positioned in the proximity of the tire rubber innerliner layer.

In practice, and in one embodiment of the invention, the ratio of thickness of the thicker upper layer of said polyurethane sealant to the thinner lower layer of said of polyurethane sealant is at least 5/1 with said non-woven microfiber layer therebetween.

In practice, and in one embodiment of the invention, said thicker polyurethane layer has a thickness, for example, in a range of from about 1 to about 8 millimeters (mm).

In practice, and in one embodiment of the invention, said thinner polyurethane layer has a thickness, for example, in a range of from about 0.1 to about 3 mm, so long as it is at least 2 mm thinner than said thicker polyurethane layer.

In practice, said non-woven microfiber layer has a thickness, for example, in a range of from about 0.01 to about 0.2 mm.

In practice, said non-woven microfiber layer may be composed of short non woven fibers comprised of, for example, nylon, polyester or polyurethane fibers.

The polyurethane based precursor composite, in one embodiment, may be prepared, for example, by pouring a liquid polyurethane reaction mixture over a non-woven microfiber layer (for example where the non-woven microfiber layer is placed on a flat, textured or undulating shaped bottom of a container) and allowing a portion of the reaction mixture to imbibe into and through said non-woven microfiber layer to form a thin polyurethane precursor layer beneath the polyurethane precursor-containing non-woven microfiber layer.

The polyurethane reaction mixture (polyurethane precursors with extender) is allowed to react within the container at an elevated temperature and form a continuous semisolid polyurethane contained within the non-woven microfiber layer and which constitutes a thin semisolid polyurethane layer beneath the polyurethane-containing microfiber layer and a significantly thicker semisolid polyurethane layer on the upper, and therefore opposite side of, the polyurethane-containing microfiber layer.

In practice, and in one embodiment of the invention, a layer of particulate filler and/or of short discrete fibers is formed on the polyurethane sealant by pouring a thin layer of polyurethane reaction mixture in a flat bottomed container and applying particulate filler and/or non-woven microfiber layer on top of it followed by pouring a relatively thick layer of the polyurethane reaction mixture thereon.

Representative of particulate filler is, for example, at least one of carbon black, pigment, silica and particulate pre-cured rubber.

Representative of short fibers is, for example, at least one of aramid (polyaramid), polyester and polyamide short fibers.

The pneumatic tire, in one embodiment, may be prepared by positioning a rubber innerliner on a tire-building apparatus. The polyurethane based sealant precursor composite is positioned directly on the rubber innerliner or an adhesive layer, if present. Such optional adhesive layer is preferably a solventless (solvent free) adhesive film to enhance bonding of the rubber innerliner layer to the polyurethane sealant. Exemplary of such adhesive film is a film of extruded diene-containing, for example, a butadiene-containing thermoplastic polyurethane (TPU) such as, for example, TPU 7840™ from Sartomer Company, Inc. which has been extruded to form a film thereof. It is envisioned that the diene component, for example the butadiene component of the TPU 7480™ film promotes bonding of the film to the rubber of the carcass barrier rubber layer and said innerliner rubber layer while the polyurethane component of the TPU 7480™ promotes bonding to the polyurethane based sealant layer.

For example, composite of polyurethane based sealant may be bonded to said rubber barrier layer by a film of the diene-containing thermoplastic polyurethane (TPU) positioned between the polyurethane of said composite and said rubber barrier layer.

Alternately, adhesion of the polyurethane based sealant layer may be promoted by including such diene-containing, for example the butadiene-containing, TPU, or by including a millable (low molecular weight) polyurethane in the rubber composition of the carcass barrier rubber layer and/or in the rubber composition of the inner liner rubber layer.

A tire carcass, with its contained innermost carcass barrier rubber layer, is therefore disposed outwardly of the polyurethane based precursor sealant layer followed by a rubber tire tread on the tire carcass to define an unvulcanized tire assembly.

The unvulcanized tire assembly then is vulcanized under conditions of heat and pressure. During curing, the polyurethane based sealant precursor thermally degrades to give a more fluid polyurethane composition thereby defining, or creating, the built-in sealant layer and providing the pneumatic tire with self-sealing properties.

By virtue of the foregoing, there is provided a pneumatic tire having an ability to seal against various puncturing objects.

BRIEF DESCRIPTION OF THE DRAWINGS

The accompanying drawings illustrate embodiments of the invention in which a composite of polyurethane and layer of non-woven micro fiber is used, and, together with the general description of the invention given above, and detailed description given below, are provided to illustrate the invention.

FIG. 1 is a cross-sectional view of a pneumatic tire with a multi layered polyurethane sealant composite; and FIG. 2 is a view of a portion of a multi layered polyurethane based sealant precursor composite.

DETAILED DESCRIPTION OF THE DRAWINGS

Figure 3:
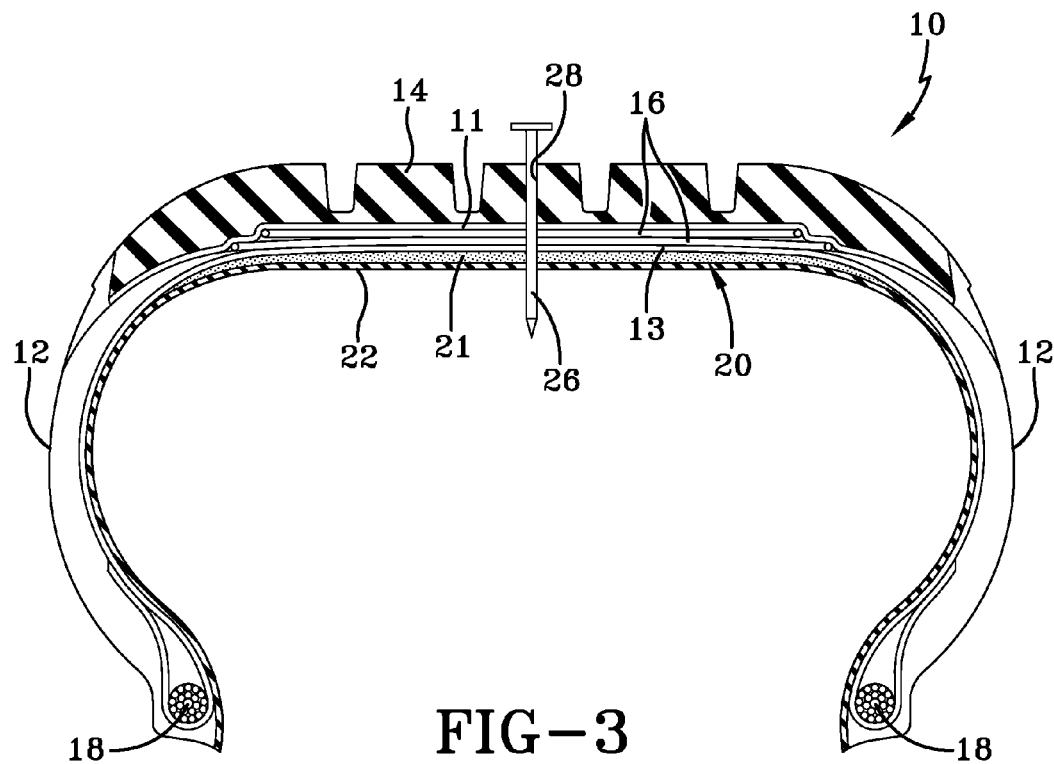
FIGS. 3 and 3A (FIGS. 3 and 3A) relate to a test piece, namely a control test piece.

FIG. 1 shows a pneumatic tire 10 that has an ability to seal punctures resulting from various puncturing objects such as, for example, nails. The tire 10 is comprised of sidewalls 12, an outer circumferential rubber tread (or tread portion) 14, a supporting carcass 13, spaced apart inextensible beads 18, belt layers 16, an additional belt layer 11, a built-in sealant layer composite 20, and an innermost rubber innerliner 22.

The sealant layer composite 20 is a multilayered composite composed of a non-woven microfiber layer 20A of a network of short non woven nylon fibers which contains said polyurethane sealant within its microfiber network and two layers of said polyurethane sealant 21 and 21-A each layer being positioned on opposite sides of said polyurethane-containing microfiber layer 20A to form a sandwich configuration thereof.

The individual sidewalls 12 extend radially inward from the axial outer edges of the tread portion 14 to join the respective inextensible beads 18. The supporting carcass 13 acts as a supporting structure for the tread portion 14 and sidewalls 12 and may be constructed of various cord reinforced rubber plies. The sealant layer composite 20 is disposed inwardly from the supporting carcass 13 and situated adjacent to the rubber innerliner 22. The outer circumferential tread 14 is adapted to be ground contacting when the tire 10 is in use The rubber tire innerliner 22 may be any known rubber innerliner for use in pneumatic tires 10. In one example, the rubber innerliner 22 can be a sulfur curative-containing halobutyl rubber composition of a halobutyl rubber such as for example chlorobutyl rubber or bromobutyl rubber. Such tire halobutyl rubber based innerliner layer may also contain one or more sulfur curable diene-based elastomers such as, for example, cis 1,4-polyisoprene natural rubber, cis 1,4-polybutadiene rubber and styrene/butadiene rubber, or mixtures thereof. The innerliner 22 is normally prepared by conventional calendering or milling techniques to form a strip of uncured compounded rubber of appropriate width, which is sometimes referred to as a gum strip. Tire innerliners and their methods of preparation are well known to those having skill in such art. When the tire 10 is cured, the innerliner 22 becomes an integral, co-cured, part of the tire 10.

Optionally, the innerliner rubber layer and/or carcass barrier rubber layer of said tire may contain a thermoplastic polyurethane (TPU), particularly a butadiene-containing TPU, or contain a millable (low molecular weight) polyurethane to aid adhesion of the polyurethane based sealant layer to the innerliner rubber layer and/or carcass barrier rubber layer.

Referring back to the drawings, optionally, the innerliner 22 rubber may therefore contain some butadiene containing thermoplastic polyurethane (TPU) such as for example said TPU 7840™ from Sartomer Company, Inc, blended therein to promote adhesion of the innerliner rubber layer 22 to the polyurethane sealant layer 20.

The built-in sealant layer composite 20, prior to vulcanization of the pneumatic tire 10, may be referred to herein as a precursor sealant layer. The polyurethane composition of the sealant layer composite 20 can include a self-healing polyurethane elastomeric material, which may contain, for example, methylene diphenyl 4,4'-diisocyanate (MDI) and poly(alkylene oxide)glycol. Suitable polyurethane compositions for the precursor sealant layer 23 having a crosslink density in a range of from about 0.3 to about 0.6 milliseconds$^{-1}$, which might be obtained, for example, from Novex, Inc of Wadsworth, Ohio.

Upon vulcanization of the tire at an elevated temperature, polyurethane composition having a crosslink density in a range of from about 0.2 to about 0.5 milliseconds$^{-1}$ thermally degrades to give a thinner polyurethane composition, namely a polyurethane composition having a somewhat greater degree of fluidity, that provides the pneumatic tire 10 with self-sealing properties and defines the built-in sealant layer composite 20.

The resulting built-in sealant layer composite 20 may further include a colorant in the polyurethane to provide a non-black colored built-in sealant layer having the capability of visibly identifying a puncture wound. That puncture wound may extend through a black colored rubber innerliner layer, black colored rubber tire tread, and/or black colored sidewall layer to the built-in sealant layer by a physical flow of a portion of the non-black colored built-in sealant layer through the puncture wound to form a contrastingly non-black colored sealant on a visible surface of the black colored innerliner, tread, or sidewall.

The colorant may include titanium dioxide. For example, the colorant of the sealant layer 20 may be titanium dioxide where a white colored sealant layer is desired. Also, such colorant may include titanium dioxide as a color brightener together with at least one non-black organic pigment and/or non-black inorganic pigment or dye. Various colorants may be used to provide a non-black color to the sealant layer 20. Representative of such colorants are, for example, yellow colored colorants as Diarylide Yellow™ pigment from PolyOne Corporation and Akrosperse E-6837™ Yellow EPMB pigment masterbatch with an EPR (ethylene/propylene rubber) from the Akrochem Company.

The polyurethane precursor composition, prior to building the tire 10, can be prepared by mixing together the polyurethane components. The multilayered polyurethane based sealant precursor composite 20 with the particulate filler and/or non-woven microfiber layer is self-supporting so as to enable its incorporation into an unvulcanized tire without departing from standard tire building techniques and without the use of complicated, expensive tire building equipment.

The precursor sealant composite layer 20, prior to building of the tire 10, can be formed into sheet stock that can be cut into strips, for example, and then positioned on a tire building apparatus 30, such as a tire building drum, and particularly on a rubber tire innerliner layer on the tire building drum, during the tire building process. The tire building process is described in detail further below.

The tire carcass 13 generally may be any conventional tire carcass for use in pneumatic tires 10. Generally, the tire carcass 13 includes one or more layers of plies and/or cords to act as a supporting structure for the tread portion 14 and sidewalls 12. The remainder of the tire components, such as for example, the tire tread 14, sidewalls 12, and reinforcing beads 18, also generally may be selected from those conventionally known in the art. The tire carcass 13, tire tread 14, and beads 18 and their methods of preparation are well known to those having skill in such art.

The pneumatic tire of FIG. 1 may be prepared by building precursor sealant layer composite 20 into an unvulcanized tire assembly using a tire building drum and conventional tire building techniques. More specifically, the innermost rubber innerliner layer 22 is first situated or positioned on the tire drum, such as by being wrapped therearound, with the remainder of the uncured tire 10 being subsequently built thereon.

The multilayer precursor sealant composite layer 20, which is self-supporting, is positioned directly on the rubber innerliner 22. Its thickness can vary in the unvulcanized tire depending somewhat upon the degree of puncture sealing desired and the size and type of tire and its intended use. Generally, the thickness may range from about 0.13 cm (0.05 inches) to about 1.9 cm (0.75 inches). In passenger tires, the precursor sealant layer may have a thickness of about 0.32 cm (0.125 inches) whereas for truck tires, the precursor sealant layer may have a thickness of about 0.76 cm (0.3 inches). The built-in sealant layer 20 is generally situated in the crown region of the tire 10, and may include colorant so that it is of a non-black color that may contrast with the black colored innerliner, tread, or sidewall so that a tire puncture can be noticed.

Finally, the tire carcass 16 is situated, or disposed outwardly, of the precursor sealant layer composite 20 and the rubber tire tread 14 is positioned on the tire carcass 16 thereby defining unvulcanized tire assembly.

After the unvulcanized pneumatic tire is assembled, the tire is shaped and cured using a normal tire cure cycle. During curing, the polyurethane composition is thermally degraded to give a gel-like and tacky polyurethane composition that provides the pneumatic tire 10 with self-sealing properties and defines the built-in sealant layer composite 20.

Generally, the tire can be cured over a wide temperature range. For example, passenger tires might be cured at a temperature, for example, ranging from about 130° C. to about 170° C. and truck tires might be cured at a temperature, for example, ranging from about 150° C. to about 180° C. Thus, a cure temperature may range, for example, from about 130° C. to about 180° C. and for a desired period of time. In one example, the tire assembly is cured in a suitable mold at a temperature in a range of from about 150° C. to about 175° C. for a sufficient period of time to thermally degrade the polyurethane thereby forming the built-in sealant layer composite 20 which has puncture sealing properties.

After vulcanization, the polyurethane composition of the built-in sealant 20 provides the pneumatic tire 10 with better self-sealing properties.

Non-limiting examples of test pieces of the pneumatic tire 10 with built-in sealant composite 20 in accordance with the detailed description are now disclosed below. These examples are merely for the purpose of illustration and are not to be regarded as limiting the scope of the invention or the manner in which it can be practiced. Other examples will be appreciated by a person having ordinary skill in the art.

Two experimental pneumatic tire test pieces (Test Piece No. 1 and No. 2) and a control test piece were prepared for testing. Each test piece is described below.

Figure 5:
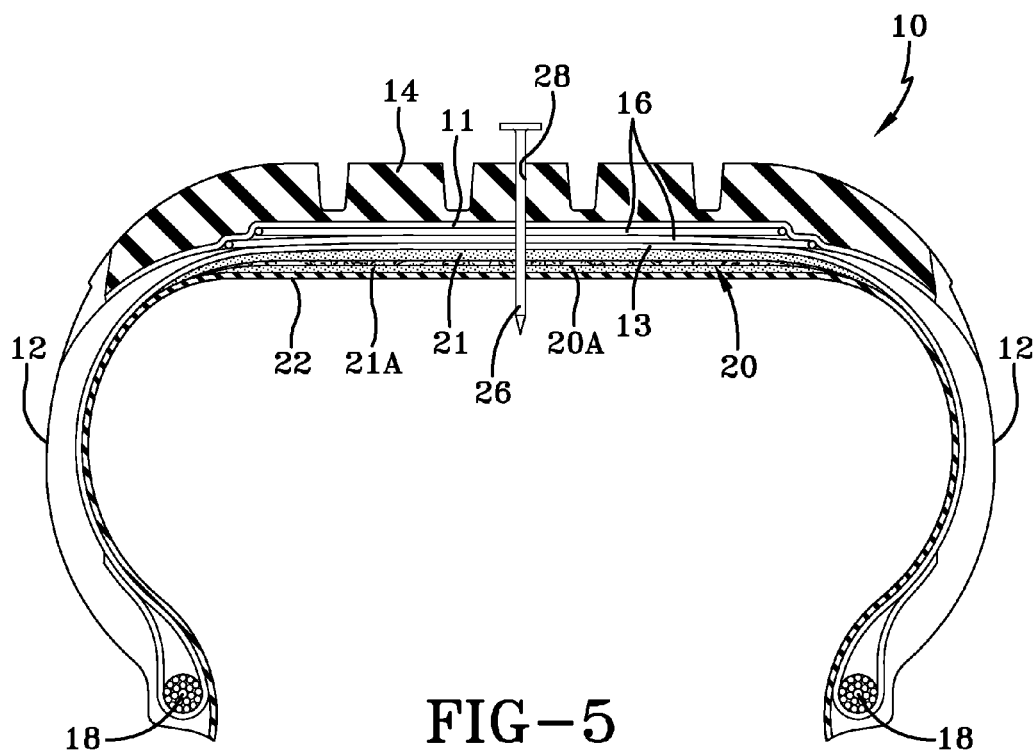
FIGS. 5 and 5A (FIGS. 5 and 5A) relate to a test piece, namely test piece No. 1.
Figure 5A:
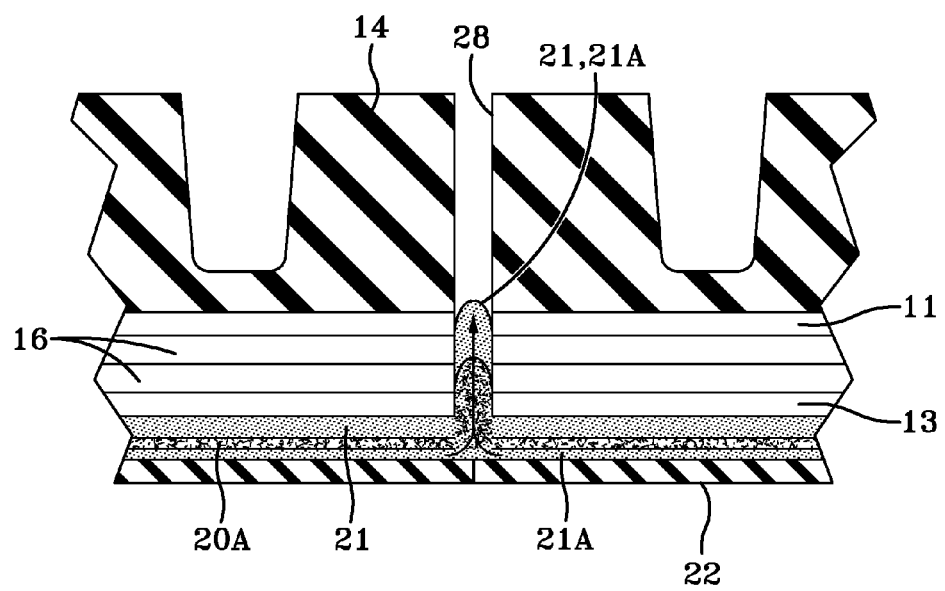

Test Piece No. 1 (See FIGS. 5 and 5A)

The following layers were assembled one on top of the other:

7"×7" (about 17.8×17.8 cm) calendered sulfur curable rubber tread strip of thickness 0.1 inch (about 2.5 mm);

4"×4" (about 10.2 to about 10.2 cm) calendered rubber having of thickness of about 0.068" containing reinforcement in a form of wire cords;

7"×7" (about 17.8×17.8 cm) sulfur curable rubber impregnated fabric belt (aligned with the wire) of thickness 0.026 inch (about 0.7 mm);

4"×4" (about 10.2 to about 10.2 cm) multilayered polyurethane based precursor sealant composite shown in FIG. 5 having an overall thickness of 0.08 inches (about 2 mm) with its thinner polyurethane layer next to the tire innerliner rubber layer;

7"×7" (about 17.8×17.8 cm) sulfur curable rubber tire innerliner liner of thickness 0.03 inches (about 8 mm).

The above laminated test piece was cured for 35 minutes at 150° C. at a pressure of about 200 psi (about 1.4 MPa)

Figure 4:
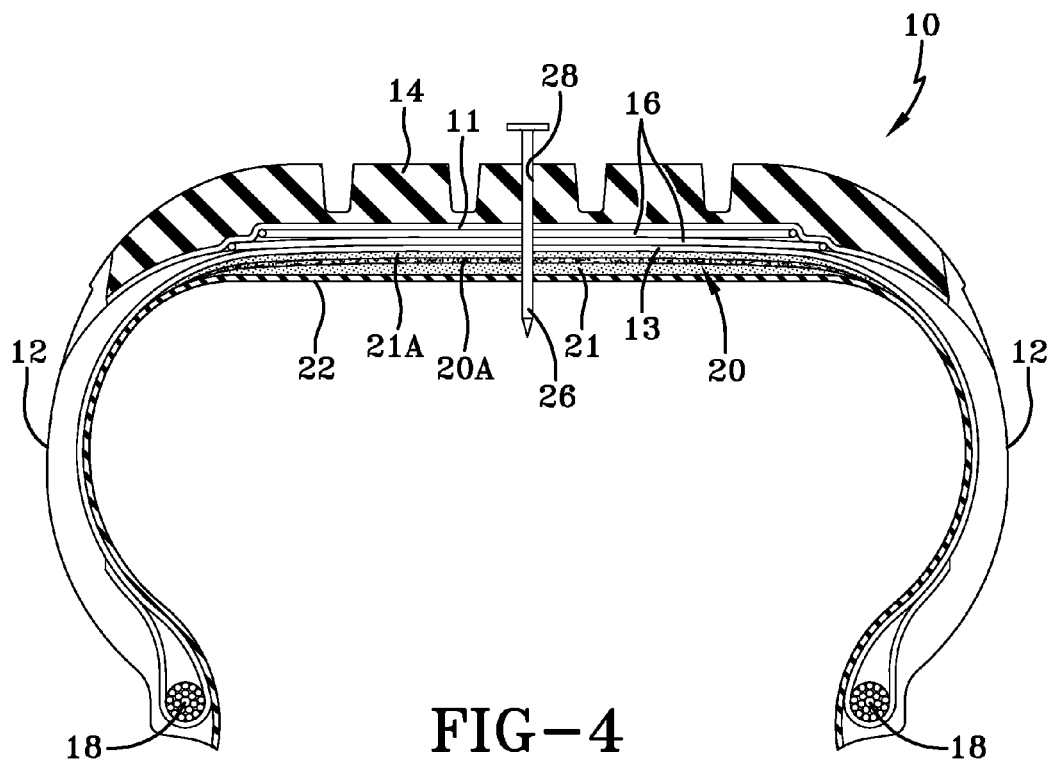
FIGS. 4 and 4A (FIGS. 4 and 4A) relate to a test piece, namely test piece No. 2.
Figure 4A:
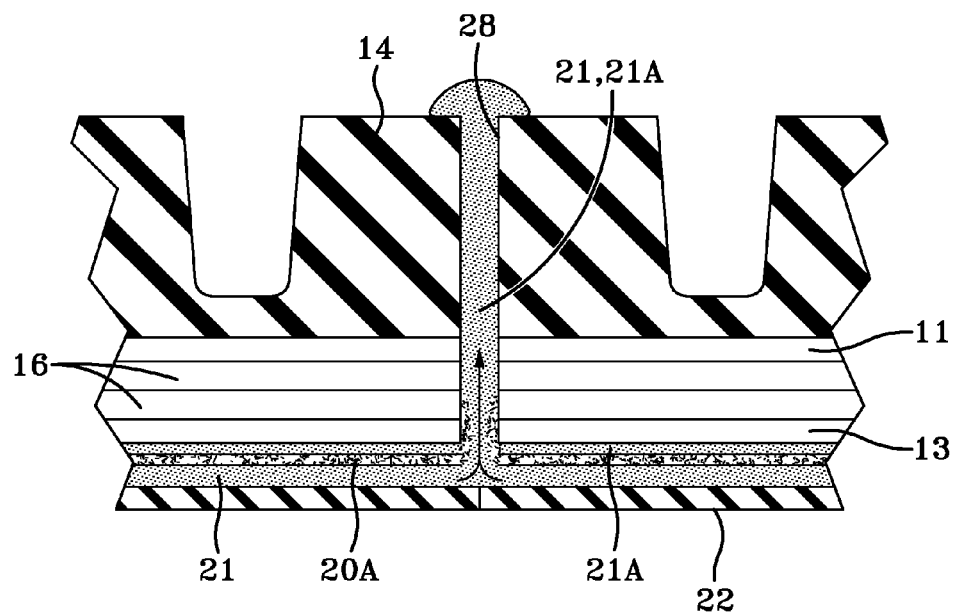

Test Piece No. 2 (See FIGS. 4 and 4A)

The test piece was prepared according to Test No. 1 except that the thicker polyurethane layer was positioned next to the tire innerliner layer.

Figure 3A:
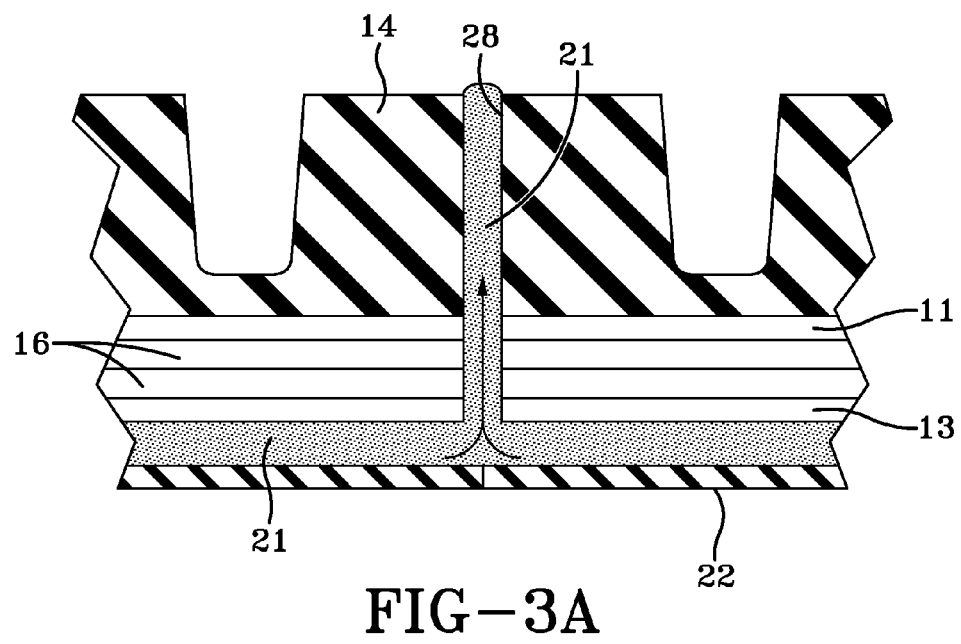

Control Test Piece (See FIGS. 3 and 3A)

The test piece was prepared according to Test Piece No. 1 except that the polyurethane based precursor was of a single layer, without the nonwoven micro fiber layer, having a thickness of about 0.08 inches (about 2 mm).

Concerning the above Test Piece No. 1, the polyurethane based precursor was obtained from Novex, Inc. of Wadsworth, Ohio. It is understood that the polyurethane based precursor sealant is comprised of methylene diphenyl 4,4'-diisocyanate (MDI) and poly(alkylene oxide)glycol. In addition, the function of crosslink density of the polyurethane composition was determined by inverse of solid state NMR relaxation times. The crosslink density value for the polyurethane before cure was about 0.416 milliseconds$^{-1}$ and after cure was about 0.344 milliseconds$^{-1}$.

The cured test pieces were tested to evaluate puncture sealing effectiveness. In the testing process, each test piece was secured lengthwise across an open chamber of a box, which defined a benchtop nail hole tester, to generally seal the opening to the chamber. Each test piece was situated so that the innermost innerliner faced the open chamber and the tire tread faced outwardly. In the chamber, air pressure could be established via an inlet valve, maintained, and monitored to simulate a pressurized pneumatic tire. A nail was used to manually puncture the test piece. Each test piece was subjected to puncturing by nails of varying and increasing diameter to evaluate air pressure loss after nail insertion, removal, and reinflation (if needed). Air pressure readings at each step were taken after a two-minute period. The results of the puncture sealing testing are set out in Table I below.

TABLE 1

|  | Control Test Piece See FIGS. 3 and 3A | Test Piece No. 2 See FIGS. 4 and 4A | Test Piece No. 1 See FIGS. 5 and 5A |
|---|---|---|---|
| Thinnest polyurethane layer | None | Yes | Yes |
| Location of the thin polyurethane layer |  | Away from innerliner | Next to innerliner |
| Crosslink density of polyurethane | 0.333 | 0.351 | 0.351 |
| Crosslink density of polyurethane after 30 minutes @ 150° C. | 0.244 | 0.265 | 0.265 |
|  | Pressure in terms of psi, or pounds per square inch | | |
| Nail, 0.136 in dia. (3.5 mm) Nail insertion | | | |
| Initial and after 2 minutes Nail removal | 35-35 | 35-35 | 35-35 |
| Initial and after 2 minutes Reinflation to 35 psi | 35-35 not needed | 35-35 not needed | 35-35 not needed |
| Nail, 0.165 in dia. (4.2 mm) Nail insertion | | | |
| Initial and after 2 minutes Nail removal | 35-35 | 35-35 | 35-35 |
| Initial and after 2 minutes Reinflation to 35 psi | 35-35 not needed | 35-0 35-0 | 35-35 not needed |
| Nail, 0.235 in dia. (6 mm) Nail insertion | | | |
| Initial and after 2 minutes | 35-35 | test not needed because 4.2 mm nail | 35-35 |
| Nail removal | | insertion failed | |
| Initial and after 2 minutes | 35-2 | test not needed | 35-32 |
| Reinflation to 35 psi | 35-24 | test not needed | 35-35 |

Note:
the pressure for the above experiments is reported in terms of psi, or pounds per square inch. Metric conversion can be made by the relationship "100 psi = 0.7 MPa"

From Table 1 it can be seen that the Test Piece No. 1 presented the best nail hole sealing ability for the hole formed by the larger 6 mm diameter nail followed by the Control Test Piece and then Test Piece No. 2.

This is considered to be significant in a sense that nail hole sealing ability was clearly enhanced in an unexpected manner by the inclusion of the non-woven microfiber layer, particularly where it is in a position in closer proximity to the innerliner rubber layer, namely where the thinner polyurethane layer of the sealant layer is positioned next to the rubber innerliner layer, which is considered herein to be a significant discovery.

From Table 1 it can also be seen that the thermal degradation of the polyurethane after the 30 minute cure time is evidenced by a reduction of its crosslink density to 0.265 milliseconds$^{-1}$ from 0.351 milliseconds$^{-1}$.

It is further seen that thermal degradation of the polyurethane used for the Control Test Piece after the 30 minute cure time is evidenced by a reduction of its crosslink density to 0.244 milliseconds$^{-1}$ from 0.333 milliseconds$^{-1}$.

As indicated above, Test Piece No. 1 exhibited the best nail hole sealing ability.

This is considered significant in a sense that it indicates that the thinner polyurethane sealant layer can be used if an intermediate nonwoven microfiber layer is used, particularly if it is positioned within the polyurethane sealant layer in proximity to the innerliner rubber layer, namely that the thinner polyurethane layer of the polyurethane sealant layer is positioned next to the rubber innerliner layer.

Based upon the test results presented in Table 1, the puncture sealing property of Test Piece No. 1 with the nonwoven layer positioned in the proximity of the innerliner layer, namely that the thinner polyurethane layer was positioned next to the innerliner layer, was better than the Control Test Piece and better than Test Piece No. 2 for the larger nail diameter.

For example, the test results showed that nail holes resulting from a puncturing nail having a diameter of nearly one fourth of an inch, namely 0.235 inch (about 0.6 mm) could be sealed under the test conditions where the nonwoven microfiber layer is in proximity to the innerliner rubber layer, namely that the thinner polyurethane layer of the polyurethane sealant layer is positioned next to the rubber innerliner layer. This is considered herein to be a significant discovery.

Based upon the test results, the puncture sealing properties of Test Piece No. 2 with the nonwoven layer positioned away from the innerliner layer (namely that the thicker polyurethane layer, instead of the thinner polyurethane layer, of the sealant layer is positioned next to the innerliner layer) are seen to be at least as good as the Control Test Piece for a nail with diameter of 0.136 inch (about 0.36 mm) diameter.

Standard differential scanning calorimetry (DSC) testing was conducted on Test Piece No. 1 to evaluate glass transition temperatures (onset and inflection) of the polyurethane. The results are shown in Table 2 below.

TABLE 2

DSC of Polyurethane Sealant

| | Tg |
|---|---|
| Polyurethane of Test Piece No. 1, (on-set) | −67.4° C. |
| Polyurethane of Test Piece No. 1, (inflection) | −64.7° C. |

From Table 2 it can be seen that the polyurethane sealant would not be expected to become brittle at −64° C.

This is considered to be significant in a sense that this indicates that the polyurethane sealant may be useful in colder climates.

Accordingly, the glass transition test results showed that the polyurethane composition can perform satisfactorily as a nail hole sealant even if the temperature is low indicating that the polyurethane composition can be utilized over a broad temperature range.

Accordingly, there is provided a pneumatic tire 10 that has an ability to seal against various puncturing objects.

Additional Drawings

FIGS. 3, 4 and 5 are cross-sectional views of a portion of a Control construction single layer polyurethane sealant (FIG. 3) and Experimental multi layered construction, or composite, of polyurethane based sealant (FIGS. 4 and 5) with a puncturing nail extending through the tread and tire innerliner.

FIGS. 3A, 4A and 5A represent FIGS. 3, 4 and 5, respectively, with the nail removed.

DETAILED DESCRIPTION OF THE ADDITIONAL DRAWINGS

FIG. 3 shows the cross-section of the tire 10 without a non-woven microfiber layer in the sealant which corresponds to Control Test Piece of Table 1, with the nail 26 puncturing the tire 10 by extending through the tread 14, sealant layer 21 and tire innerliner 22 into the tire cavity.

FIG. 3A shows the cross-section of the tire 10 of FIG. 3 with the nail 26 having been removed leaving a nail hole 28 and a portion of sealant layer 21 extending into the nail hole 28 and exiting the tread layer onto its running surface.

FIG. 4 shows the cross-section of the tire 10 of FIG. 1 corresponding to Test Piece No. 2 in Table 1 where the nail 26 punctures the tire 10 by extending through the tread 14, sealant layer 21, non-woven microfiber layer 20A, sealant layer 21A and tire innerliner 22 into the tire cavity.

In FIG. 4, for the composite of the sealant layer 21, non-woven microfiber layer 20A and sealant layer 21A, the thicker sealant layer 21A is positioned next to the tire innerliner.

FIG. 4A shows the cross-section of the tire 10 of FIG. 4 corresponding to Test Piece No. 2 in Table 1 with the nail 26 having been removed leaving a nail hole 28 and a portion of sealant layers 21 and 21A extending into the nail hole 28 with a significant amount of the sealants, flowing into the nail hole, mostly unimpeded by the non-woven microfiber layer, and exiting the tread onto its running surface.

FIG. 5 shows the cross-section of the tire 10 corresponding to Test Piece No. 1 in Table 1 of the Example where the nail 26 puncturing the tire 10 by extending through the tread 14, sealant layer 21 non-woven microfiber layer 20A, sealant layer 21A and tire innerliner 22 into the tire cavity.

In FIG. 5, for the composite of the sealant layer 21, non-woven microfiber layer 20A and sealant layer 21A, the thinner sealant layer 21 is positioned next to the tire innerliner 22 to therefore allow the non-woven microfiber layer 20A to be in closer proximity to the rubber innerliner layer 22.

FIG. 5A shows the cross-section of the tire 10 of FIG. 5 corresponding to Test Piece No. 1 in Table 1 of the Example where the nail 26 has been removed leaving a nail hole 28 and a portion of sealant layers 21 and 21A extending into the nail hole 28 with a portion of the non-woven microfiber layer forming a plug to restrict flow of the sealant layers 21 and 21A very deeply into the nail hole 28 and to therefore more effectively seal the nail hole.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A pneumatic tire comprised of an outer circumferential rubber tread, a supporting carcass containing an innermost carcass barrier rubber layer, and a rubber innerliner disposed inwardly from said supporting carcass and thereby inwardly from said carcass barrier rubber layer;

wherein said tire has a built-in composite of polyurethane based sealant layer positioned between and adjacent to said carcass barrier rubber layer of said supporting carcass and said rubber innerliner;

wherein said composite of polyurethane based sealant layer is a multilayered composite extending in a circumferential direction comprised of a thick polyurethane layer and a thin polyurethane layer with a thin intermediate layer positioned between said thick and thin polyurethane layers comprised of: a non-woven microfiber layer containing said polyurethane wherein said non-woven intermediate microfiber layer and is prepared by pouring a polyurethane precursor as a liquid reaction mixture over a non-woven microfiber layer and allowing a portion of the liquid reaction mixture to imbibe into and through said non-woven microfiber layer to form a thin polyurethane precursor layer beneath the polyurethane precursor-containing non-woven microfiber layer and a thicker polyurethane precursor layer on top of the non-woven microfiber layer and allowing the liquid reaction mixture to react at an elevated temperature to form a continuous semisolid polyurethane within the non-woven microfiber layer, thin semisolid polyurethane layer beneath the polyurethane-containing microfiber layer and a significantly thicker semisolid polyurethane layer on top of the microfiber layer, wherein said thicker layer of said polyurethane based sealant has a thickness in a range of from about 1 to about 8 millimeters (mm) and said thinner layer of said polyurethane based sealant has a thickness in a range of from about 0.1 to about 3 mm, so long as it is at least 2 mm thinner than said thicker polyurethane layer and said non-woven microfiber layer of said sealant composite has a thickness in a range of from about 0.01 to about 0.2 mm, and wherein said thin polyurethane layer of said multilayered sealant composite is positioned adjacent to said innerliner rubber layer.

2. The tire of claim 1 wherein said non-woven microfiber layer is composed of short non-woven fibers comprised of nylon, polyester or polyurethane fibers.

3. The tire of claim 1 wherein non-woven microfiber layer is composed of short non-woven fibers comprised of nylon or polyester fibers.

* * * * *